US012293594B2

(12) United States Patent
Sirat

(10) Patent No.: US 12,293,594 B2
(45) Date of Patent: May 6, 2025

(54) SUPERRESOLUTION METROLOGY METHODS BASED ON SINGULAR DISTRIBUTIONS AND DEEP LEARNING

(71) Applicant: Bioaxial SAS, Paris (FR)

(72) Inventor: Gabriel Y Sirat, Paris (FR)

(73) Assignee: Bioaxial SAS, Paris (FR)

( * ) Notice: Subject to any disclaimer, the term of this patent is extended or adjusted under 35 U.S.C. 154(b) by 0 days.

(21) Appl. No.: 18/342,184

(22) Filed: Jun. 27, 2023

(65) Prior Publication Data

US 2024/0062562 A1    Feb. 22, 2024

Related U.S. Application Data

(62) Division of application No. 16/640,288, filed as application No. PCT/IB2018/001129 on Aug. 30, 2018, now Pat. No. 11,694,453.

(Continued)

(51) Int. Cl.
*G06V 20/69* (2022.01)
*G01B 11/02* (2006.01)
(Continued)

(52) U.S. Cl.
CPC .............. *G06V 20/69* (2022.01); *G01B 11/02* (2013.01); *G01B 11/2408* (2013.01);
(Continued)

(58) Field of Classification Search
CPC ...... G06V 20/69; G06V 10/141; G06V 10/42; G06V 10/454; G06V 10/60; G06V 10/70;
(Continued)

(56) References Cited

U.S. PATENT DOCUMENTS 7,746,469 B2   6/2010  Shamir et al.
8,514,685 B2   8/2013  Sirat
(Continued)

FOREIGN PATENT DOCUMENTS

WO    WO 2016/092161       6/2016

OTHER PUBLICATIONS

Berry et al., "Conical diffraction: observations and theory," *Proc. R. Soc. A*, vol. 462, pp. 1629-1642 (Feb. 2006).

(Continued)

*Primary Examiner* — Michael P LaPage
(74) *Attorney, Agent, or Firm* — Sunstein LLP

(57) ABSTRACT

Methods for determining a value of an intrinsic geometrical parameter of a geometrical feature characterizing a physical object, and for classifying a scene into at least one geometrical shape, each geometrical shape modeling a luminous object. A singular light distribution characterized by a first wavelength and a position of singularity is projected onto the physical object. Light excited by the singular light distribution that has interacted with the geometrical feature and that impinges upon a detector is detected and a return energy distribution is identified and quantified at one or more positions. A deep learning or neural network layer may be employed, using the detected light as direct input of the neural network layer, adapted to classify the scene, as a plurality of shapes, static or dynamic, the shapes being part of a set of shapes predetermined or acquired by learning.

8 Claims, 9 Drawing Sheets

Related U.S. Application Data

(60) Provisional application No. 62/551,913, filed on Aug. 30, 2017, provisional application No. 62/551,906, filed on Aug. 30, 2017.

(51) Int. Cl.

| | | |
|---|---|---|
| *G01B 11/24* | (2006.01) | |
| *G06F 18/24* | (2023.01) | |
| *G06V 10/141* | (2022.01) | |
| *G06V 10/42* | (2022.01) | |
| *G06V 10/44* | (2022.01) | |
| *G06V 10/60* | (2022.01) | |
| *G06V 10/70* | (2022.01) | |
| *G06V 10/82* | (2022.01) | |

(52) U.S. Cl.
CPC ............ *G06F 18/24* (2023.01); *G06V 10/141* (2022.01); *G06V 10/42* (2022.01); *G06V 10/454* (2022.01); *G06V 10/60* (2022.01); *G06V 10/70* (2022.01); *G06V 10/82* (2022.01)

(58) Field of Classification Search
CPC ...... G06V 10/82; G06V 10/143; G01B 11/02; G01B 11/2408; G06F 18/24; G06F 18/00
See application file for complete search history.

(56) References Cited

U.S. PATENT DOCUMENTS

| | | | |
|---|---|---|---|
| 9,250,185 | B2 | 2/2016 | Sirat |
| 2008/0037004 | A1* | 2/2008 | Shamir .............. G01N 15/1459 356/336 |
| 2013/0176574 | A1 | 7/2013 | Sirat |
| 2015/0212308 | A1 | 7/2015 | Sirat et al. |
| 2017/0322406 | A1* | 11/2017 | Sirat .................. G01N 21/6458 |
| 2017/0336326 | A1 | 11/2017 | Sirat et al. |

OTHER PUBLICATIONS

Berry, "Conical diffraction asymptotics: fine structure of Poggendorff rings and axial spike," *J. Opt. A: Pure and Applied Optics*, vol. 6, pp. 289-300 (2004).

Berry, "Conical diffraction from an N-crystal cascade," *J. Opt.*, vol. 12, Issue No. 8, pp. 1-8 (2010).

Badham et al., "Filamentous Influenza Viruses," *Current clinical microbiology reports*, vol. 3, pp. 155-161 (2016).

Caron, Julien et al., "Conical Diffraction illumination opens the way for low phototoxicity super-resolution imaging," *Cell Adhesion and Migration*, vol. 8 No. 5 Sep. 2, 2014, pp. 430-439.

Gustoffson, "Nonlinear structured-illumination microscopy: Widefield fluorescence imaging with theoretically unlimited resolution," *Proc.Nat. Acad.Sci.*. vol. 102, pp. 13081-13086 (Sep. 13, 2005).

Hamilton, "Third supplement to an essay on the theory of systems of rays," *Trans. Royal Irish Acad.*, vol. 17, pp. 1-144 (1837).

Hotsmeyer et al., "Standardizing the resolution claims for coherent microscopy," *Nature Photonics 10*, pp. 68-71 (2016).

LeCun et al., "Deep learning," *Nature*, vol. 521, pp. 436-445 (2015).

Lloyd, "On the Phenomena Presented by Light in Its Passage along the Axes of Biaxial Crystals," *The Transactions of the Royal Irish Academy*, vol. 17, pp. 145-157 (1831).

Nye et al., "Dislocations in wave trains," *Proceedings of the Royal Society of London A*. vol. 336. pp. 165-190 (1974).

Pagliuso et al., "A role for septin 2 in Drpl-mediated mitochondrial fission," *EMBO Reports*, vol. 17, pp. 857-873 (2016).

Schermelleh, et al., "A guide to super-resolution fluorescence microscopy," *J. Cell Biology*, vol. 190, pp. 165-175 (2010).

Shamir, "Singular beams in metrology and nanotechnology," *Opt. Eng.*. vol. 51, 073605 (2012).

Soskin et al., "Singular optics," *Progr. in Optics*, vol. 42, pp. 219-276, 2001.

Spiliotis et al., "Priming for destruction: septins at the crossroads of mitochondrial fission and bacterial autophagy," *EMBO Reports*, vol. 17, pp. 935-937 (2016).

\* cited by examiner

SUPERRESOLUTION METROLOGY METHODS BASED ON SINGULAR DISTRIBUTIONS AND DEEP LEARNING

The present divisional application claims the priority of U.S. Nonprovisional application Ser. No. 16/640,288, which is the U.S. National Stage under 35 U.S.C. 371 of PCT App. No. PCT/IB2018/001129, which claims priority of two U.S. Provisional applications, Ser. Nos. 62/551,906 and 62/551,913, both filed Aug. 30, 2017. Each of the foregoing applications is hereby incorporated herein by reference.

TECHNICAL FIELD

The present invention relates to methods and apparatus for optical measurement of geometrical features, using machine, representation and deep methods of learning, and, more particularly, for optical measurement using a projected singular light distribution.

BACKGROUND ART

Metrology is the technical field of measurement. Measurements based on fluorescence, multiphoton imaging, Raman scattering, optical transmission, reflection or optical scattering, are practically limited in resolution to the limit stated by Ernst Abbe in 1873. The Abbe limit arises due to diffraction by a defining aperture of the optical system used to illuminate or collect light from a sample, as discussed below.

Some biological and life science objects can be modeled mathematically as elementary geometrical shapes. Precise quantification of the parameters of such a model is one of the challenges of modern biology and life science; it will reveal hidden information, directly or statistically, about the biological objects and their functionality. Sirat, in U.S. Pat. No. 9,250,185 (hereinafter, the "Sirat '185 patent"), which is incorporated herein by reference, defines a "luminous biological object", as a "map" of the physical object, "in the sense of . . . general semantics." (Sirat '185 patent, col. 18, lines 15-22.)

Measuring shape, or other geometrical attributes of an object, consists of applying the parameterized shape assumption—referred in this invention as the mathematical prior—on the elemental and/or the reconstructed data from a "luminous biological object," and retrieving the parameters of the shape from the data. Furthermore, another mathematical constraint exits on the data, the positivity, which is due to the intrinsic positivity of light intensity.

In prior art, both the mathematical prior and the positivity constraint rely on a traditional imaging paradigm. The mathematical prior and positivity constraint have to be applied on the resulting images, as a post-processing step, after image acquisition and reconstruction. This imaging paradigm can be traced back to the earliest days of microscopy, in which shape measurement was conceived as a concomitant of imaging and not as a discipline per se.

The shape assumption is a strong mathematical prior, and would tremendously reduce the number of degrees of freedom of the solution, and create for the solution an embedded parametric space, once the present invention is described below. As used herein, the term "mathematical prior" shall refer to any mathematical assumption with respect to the result of a measurement that reduces the number of degrees of freedom of the problem at hand. Applying the mathematical prior after the acquisition and reconstruction processes, as has been done in the past, with respect to the data acquired using a general imaging paradigm, reduces the precision of the overall metrology process.

Historical Perspective

After some training on newer hardware and software, Ernst Abbe, who lived from 1840 to-1905, would have been comfortable using the latest generation of biological microscopes for imaging and measurement. The persistence of biological imaging and metrology methods is due to, above all, the quality of the concepts developed by our predecessors, but it is also due to the difficulty to modify rooted working procedures.

However, several new trends are shaking entrenched microscopic observation archetypes, even in biology. A major evolution results from a desire to quantify precisely elementary parameters of models of biological objects in a comprehensive statistical way and not to base the biological observation only on images or assumptions.

J. Shamir, in "*Singular beams in metrology and nanotechnology,*" *Opt. Eng.*, vol. 51, 073605 (2012), and in U.S. Pat. No. 7,746,469, both of which are incorporated by reference, has suggested the use of singular light distributions to quantify distributions of particle size.

To the Inventor's knowledge, the creation of null images that use the absence of photons to achieve resolution unattainable where light itself is imaged has never been suggested. Shamir's teachings, in particular, use elastic interactions, such as reflection, transmission and (elastic) scattering. It would be advantageous to obtain information based on null images, and the invention, described in detail below, illustrates how such imaging may be performed.

Background: Measurement of Parameters of Geometrical Shapes

While all the measuring systems and methods used in biological microscopy need not be reviewed, theoretically, the limit of measurement of any parameter, including the parameters describing a shape, is ultimately dictated by signal to noise and can be quantified using the Cramer Rao lower bound, CRLB, defined below. However, for shape-related parameters, the calculation is badly conditioned and relies on measurements that are not precise due to practical and experimental conditions.

As an example, Gustafsson, "*Nonlinear structured-illumination microscopy: wide-field fluorescence imaging with theoretically unlimited resolution,*" *Proc. Nat. Acad. Sci.*, vol. 102, pp. 13081-86 (2005), incorporated herein by reference, presented nonlinear structured-illumination microscopy, a super-resolution technique, coupling nonlinear saturation effects and structured illumination. Gustafsson's technique, considered exemplary by persons skilled in the microscopic arts, demonstrated, in the best case, a resolution of 50 nm. This measurement was performed on calibrated, isolated, planar, identical manufactured beads, able to sustain high energy levels, not prone to photobleaching or phototoxicity, which were chosen by Gustafsson to be of precise diameter of 51 nm, a bead of size almost identical to the resolution limit.

Based on the foregoing data, the influence of the bead size, the simplest possible measurement of a shape parameter, calculated by an exact procedure, ("known bead shape was removed from the reconstruction by linear deconvolution"), Gustafsson 2004 was less than 10% of the "System Ruler", defined below, of his experiment. If the same experiment were to have been performed as a procedure to quantify the value of an unknown diameter of the bead, the relative precision would have been 5%, a relatively poor performance in this ideal case. This indicates the desirability of an improved tool for measurement of shape parameters, such as described below in accordance with the present invention.

Deep Learning Background

An abundant literature surrounds deep learning. The reader is referred to Wikipedia, en.wikipedia.org/wiki/Deep_learning, and to references cited therein. A synthesis of deep learning concepts may be found in LeCun et al., "*Deep learning,*" *Nature*, vol. 521, pp. 436-45 (2015), hereinafter "LeCun 2015," incorporated herein by reference, defining several basic concepts, used in the following. According to LeCun 2015:

Representation learning is a set of methods that allows a machine to be fed with raw data and to automatically discover the representations needed for detection or classification. Deep-learning methods are representation-learning methods with multiple levels of representation, obtained by composing simple but non-linear modules that each transform the representation at one level (starting with the raw input) into a representation at a higher, slightly more abstract level. With the composition of enough such transformations, very complex functions can be learned. For classification tasks, higher layers of representation amplify aspects of the input that are important for discrimination and suppress irrelevant variations. An image, for example, comes in the form of an array of pixel values, and the learned features in the first layer of representation typically represent the presence or absence of edges at particular orientations and locations in the image. The second layer typically detects motifs by spotting particular arrangements of edges, regardless of small variations in the edge positions. The third layer may assemble motifs into larger combinations that correspond to parts of familiar objects, and subsequent layers would detect objects as combinations of these parts. The key aspect of deep learning is that these layers of features are not designed by human engineers: they are learned from data using a general-purpose learning procedure.

(LeCun 2015, p. 436, emphasis added)

The archetype of a deep learning network as currently practiced includes processing an acquired image. FIG. 6 exemplifies a deep learning network according to previous art, following LeCun 2015 teaching; an image 10, illustrated by a cat picture, is the input of the network. A first layer 11 typically learns the presence or absence of edges at particular orientations and locations in the image. Additional layers, represented schematically by numerals 12 and 13, learned from data using a general-purpose learning procedure, are able to identify the cat species and that it is not a dog.

"CODIM," as used herein, refers to COnical DIffraction Microscopy hardware, as described in Caron, et al. (2014). "Conical diffraction illumination opens the way for low phototoxicity super-resolution imaging." *Cell adhesion & migration*, vol. 8, pp. 430-439 (2014), hereinafter "Caron 2014," incorporated herein by reference. Use of hardware as described in Caron 2014 is referred to as "the imaging case." The hardware set-up and use described below as "the metrology case," is not part of the prior art. In the imaging case, singular light distributions are projected on a regular grid, the grid being Cartesian, or on a grid optimized as a function of the retrieved data.

The canonical way to apply CODIM in a deep learning or machine learning network is to reconstruct the image and to apply a known algorithm to the reconstructed image. The limitation of such methods is the time burden and information corruption entailed in image reconstruction.

The Sirat '185 patent states:

The measurement system will calculate an evaluation of the descriptors of the fluorophores, the measured map. This measured map differs from the original map, due to noise, measurement conditions, the system limits or measurement uncertainty. This information map can be developed later into different levels of abstraction.

(Sirat '185 patent, col. 18, lines 37-42, emphasis added)

The Sirat '185 patent further teaches that:

The primordial Information, the map in the terminology of general semantics, is the set of descriptor fluorophores and their evolution over time. Biological and geometric information will only be extrapolations of this primordial information. The measurement system will calculate an evaluation of the descriptors of the fluorophores, the measured map.

(Sirat '185 patent, col. 18, lines 32-37)

Sirat '185 assumed that "[t]he measurement system will calculate an evaluation of . . . the measured map" (Ibid., emphasis added), seeing the measurement map as a prerequisite to any information gathering. In requiring a measurement map as a prerequisite to information gathering, Sirat '185 was following the prevalent consensus that the "measured map" is a prerequisite to further processing, as geometrical and biological levels of abstractions, described by Sirat '185, in the same paragraph.

SUMMARY OF EMBODIMENTS OF THE INVENTION

In accordance with embodiments of the present invention, methods are provided for determining a value of an intrinsic geometrical parameter of a geometrical feature of a specified dimensionality characterizing a physical object. The method has steps of:

a. projecting a singular light distribution characterized by a first wavelength and a position of singularity onto the physical object;

b. detecting light excited by the singular light distribution excited that has interacted with the geometrical feature and that impinges upon a detector, the light constituting detected light;

c. identifying and quantifying a return energy distribution at one or more positions of the singular light distribution as a quantification of the intrinsic geometrical parameter; and d. determining the value of the intrinsic geometrical parameter based on the parameters retrieved from energy distribution.

In accordance with other embodiments of the present invention, successive applications of the aforesaid method are performed, in such a manner as to retrieve a single or a set of intrinsic geometrical parameters. The intrinsic geometrical parameter may be one of the size and ellipticity of a point-object. A measure of displacement may be determined that is an offset transverse to a line.

In accordance with further embodiments of the invention, the intrinsic geometrical parameter may be a width of a line. The intrinsic geometrical parameter may be based upon a model shape of the geometrical feature. Detecting light may include employing a pixelated detector.

In accordance with another aspect of the present invention, a method is provided for representation learning for classifying a scene into at least one geometrical shape, static or dynamic, quantified by an adequate set of parameters, each geometrical shape modeling a luminous object. The method has steps of:

a. projecting a singular distribution of light onto a scene;
    b. detecting a light distribution, reemitted by the scene upon illumination by the singular light distribution that has interacted with each luminous object and that impinges upon a detector, the light detected constituting detected light;
    c. measuring at least one projection of a singular distribution at a given position to obtain a set of measurements with respect to a scene; and
    d. employing a deep learning or neural network layer, using the detected light as direct input of the neural network layer, adapted to classify the scene, as a plurality of objects, physical or biological, or as geometrical shapes, static or dynamic, the objects or shapes being part of a set of objects or shapes predetermined or acquired by learning.

In accordance with other embodiments of the present invention, the at least one geometrical shape may be either dynamic or static. The method may also include acquiring data that is imaging data acquired by CODIM hardware, or that is metrological data acquired by Metrology Application hardware.

In accordance with further embodiments of the present invention, the method may have a further step of acquiring data that is imaging data acquired by CODIM hardware, wherein resulting classification information is used to drive a metrological hardware to implement the metrological method. A further step may include providing control hardware and a control procedure to drive a metrological hardware to implement the metrological method. A further step yet may include feeding data to the neural network that has been acquired at different times and including a time dependence of luminous objects in a neural network recognition process.

BRIEF DESCRIPTION OF THE DRAWINGS

The foregoing features of the invention will be more readily understood by reference to the following detailed description, taken with reference to the accompanying drawings, in which.

DESCRIPTION OF EMBODIMENTS OF THE PRESENT INVENTION

Figure 1:
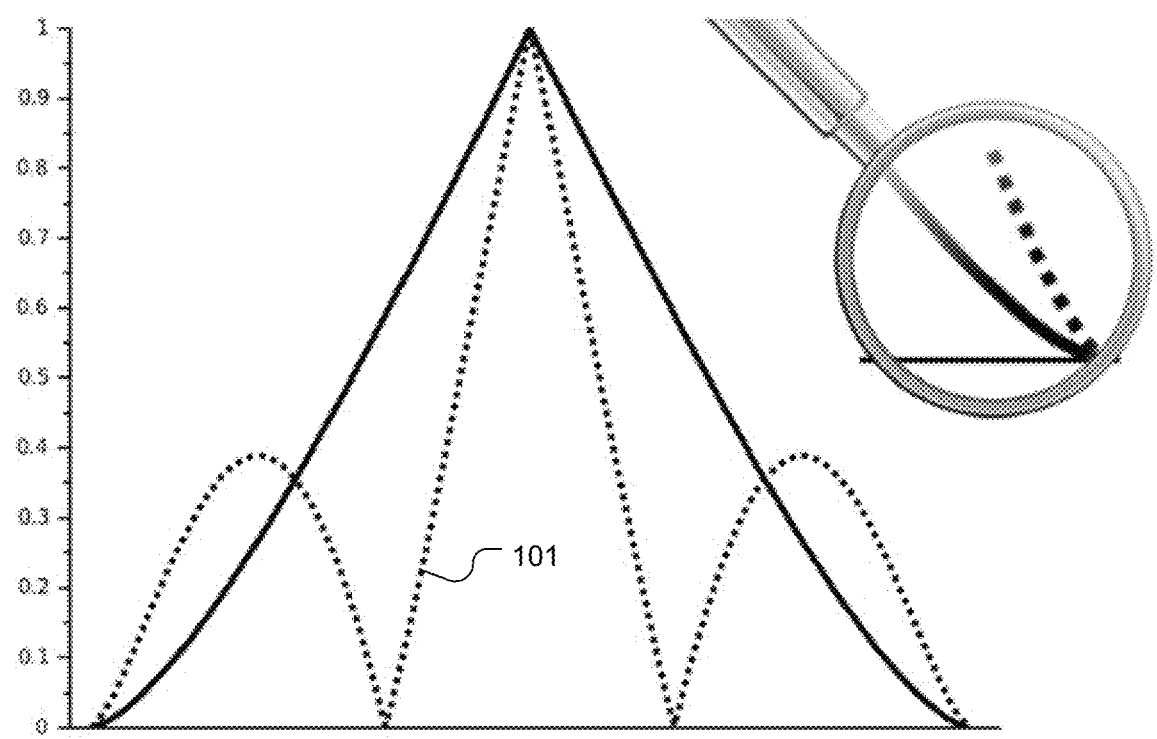
FIG. 1 shows a prior art modulation transfer function (MTF) of a CODIM light distribution compared to an Airy pattern.

New methods are presented herein, in which the measurement procedure is a separate, dedicated procedure and architecture, initialized in some cases by an imaging procedure, but fully embedded in a separate tool, the metrology tool.

The invention described below is directed towards accurately measuring geometrical features that are smaller than the diffraction limit of light employed in their measurement, with minimal flux.

This invention is especially adapted to measuring geometrical features using inelastic light interaction, as, but not limited to, fluorescence, multi-photon imaging, or Raman scattering, in which the emerging light can be separated by simple means from the incoming light.

Some embodiments of the present invention relate to methods, and to hardware systems implementing them, for machine learning of geometrical and functional features and objects. These methods entail classification and recognition of features and objects; these methods differ from the actual solutions based on an imaging paradigm and on further processing subsequent to imaging.

While some embodiments of the present invention is primarily described with reference to systems and methods implemented in fluorescent microscopy, it is to be understood that extension to reflected or scattered light is straightforward and within the ken of persons of ordinary skill in the art who have understood the present description. Moreover, while this invention is described herein in terms of systems and methods for metrological tools of fluorescent objects encountered in biology, they may be readily applied to other imaging modalities and to other disciplines and domains, such as, but not limited to semiconductors and machine vision.

It would be useful to apply the mathematical prior before the reconstruction process and embed it in the acquisition process, however there has never been any teaching how that might be done, and that is now described here in detail. The application of a mathematical prior before image reconstruction, in accordance with embodiments of the present invention, may advantageously increase the accuracy of the measurement of the parameters of the shape, reducing the number of observations required for measurement and increasing the stability and reproducibility of the overall process.

Methods described in accordance with embodiment of the present invention rely on the specificity of Poisson's law, explicitly the absence of photon noise—up to a negligible number due to quantum physics theory—in the absence of photons, any photons, both incident and emitted on the detector, and not a posteriori correction. Such methods require a mechanism to physically remove the incident light, through a filtering operation. It cannot be a mathematical post-processing operation because if the noise, have been already introduced in the system, it cannot be filtered out by simple means. This is the advantage and specificity of inelastic light interactions; inelastic light interaction, will refer in this invention to any light interaction able to create (or emit) new photons with a physical characteristic differentiating them from the incident photons in a way that the emitted photons can be physically separated from the incident photons. It is assumed that a "filter" allows separating the emitted photons from the incident photons. The obvious example of an inelastic light interaction is an interaction creating photons at a different wavelength; in this case the filter will be a wavelength sensitive filter. Examples of inelastic light interaction are fluorescence, multi-photon imaging or Raman scattering. Elastic light interactions, such as reflection, transmission or elastic scattering, do not allow for such discrimination in a simple way.

As explained hereinafter, embodiments of the present invention rely on creating null images, or images close to the null image. Such images allow additional resolution, theoretically unlimited, as will be described below, by combining a loophole of Abbe's law with the absence of noise due to Poisson's law. A prerequisite is the absence of any spurious photon, required to fulfill the theoretical conditions. Such conditions may be met almost only using inelastic light interactions, as fluorescence, multiphoton interactions and Raman scattering, in which the incoming beam can be totally filtered by spectral means.

For heuristic convenience, the invention may be illustrated herein by a hypothetical example; this example is used just as an illustration and is not intended to represent a tested experimental case. A particular biological object is assumed to constitute a luminous object, and this biological object, for illustration, is assumed to be an Influenza Type A virus, (IAV), represented schematically in FIG. 1A. The IAV virus is known to have a typical size between 80 to 120 nm, and, as discussed by Badham et al., "*The biological significance of IAV morphology in human clinical infections is a subject of great interest*," in *Filamentous Influenza Viruses, Current clinical microbiology reports*, vol. 3, pp. 155-161, (2016), incorporated herein by reference.

Figure 2A:
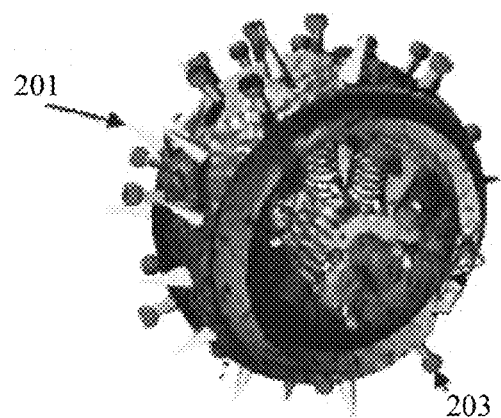
FIGS. 2A-2D represent an Influenza Type A virus (IAV) used in the present Description as an illustrative example, with the virus represented schematically in FIG. 2A, and with its three-dimensional model represented in FIG. 2B and its two-dimensional model being represented in FIGS. 2C and 2D, respectively, for an isotropic and non-isotropic model.
Figure 2B:
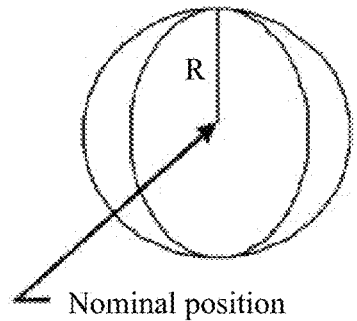

The IAV virus is assumed to be marked uniformly in all its volume with appropriate fluorescent proteins. Three different models can be used to describe the virus:

a. In the imaging paradigm used in prior art, due to the small size of the virus, under the diffraction limit, the best model will be to represent the virus as a luminous point, emitting fluorescent light; it will indeed allow accurate monitoring of the virus position.

b. Alternatively, using for example an electron microscope with nm or sub-nm resolution, various details of the virus may be characterized, including the hemagglutinin 201 and neuraminidases 203.

c. In accordance with teachings of the present invention, an intermediate way is employed in which the virus is described as a point-object, defined below, modeled either in three dimensions as a sphere, (FIG. 2B), or in two dimensions as a uniform circle, (FIG. 2C) with given radius, or as an ellipse (FIG. 2D), with parameters being the half-minor axis, a, the half-major axis, b, and the angle of the major axis, θ, relative to a Cartesian reference frame.

In accordance with further embodiments of the present invention, deep learning may be employed, as described in detail below.

Methods in accordance with embodiments of the present invention may advantageously provide for measurement entailing resolutions greater than the diffraction limit imposed by the optics and minimal photon fluxes.

In accordance with embodiments of the present invention, one or more mathematical priors resulting from the shape assumption are embedded in a specific set of singular light distributions, allowing full advantage to be taken of the properties of singular light distributions. This coupling is based on dedicated metrology tools, relating the mathematical prior and the set of distributions; in other words, the measurement of a specific shape, defines mathematically a prior and a solution domain, which itself determines the characteristics of the acquisition tool and the type of distributions required.

Definitions: As used herein and in any appended claims, the following terms will have the following specified meanings, unless the context requires otherwise:

The term "value" as used herein and in any appended claims shall refer to a real number characterizing a quantity associated with a parameter. It is to be understood that, in a practical context, the quantity associated with a parameter may be characterized within some range, constituting the accuracy of a measurement. In that case, the term "value" may be used as shorthand for a distribution of values.

the "System Ruler", is a value, which is considered by a person of ordinary skill in the imaging arts to characterize the capacity of the system to discerned details.

In imaging systems, the "Rayleigh criterion"—the capacity to separate two adjacent points—is the generally accepted criterion for the minimum resolvable detail, even if the observed FWHM of a point or a line is, in many cases, used as a practical evaluation of the "diffraction limit", a qualitative term used commonly to quantify the minimum resolvable detail. In this invention, we use the FWHM of an infinitely thin line as the system ruler. A value will be negligible if it is "much smaller" than the System Ruler, where "much smaller" is defined as smaller by a factor of 3 or more.

The term "Abbe's resolution limit" as used herein is as found in Schermelleh et al., "*A guide to super-resolution fluorescence microscopy*," J. Cell Biology, vol. 190, pp. 165-75 (2010), hereinafter "Schermelleh 2010", incorporated herein by reference:

Abbe's famous resolution limit is so attractive because it simply depends on the maximal relative angle between different waves leaving the object and being captured by the objective lens to be sent to the image. It describes the smallest level of detail that can possibly be imaged with this PSF "brush". No periodic object detail smaller than this shortest wavelength can possibly be transferred to the image.

The expression "above the Abbe's limit" is defined to refer to an object containing periodic structures containing details smaller than any details of the System Ruler, thus limited by the Abbe's limit. The rationale of this definition is that such an object contains spatial frequencies above the Abbe's circle of frequencies in the aperture plane.

In estimation theory and statistics, the Cramér-Rao bound (CRB) or, equivalently, the "Cramér-Rao lower bound (CRLB)", expresses a lower bound on the variance of estimators of a deterministic (fixed, though unknown) parameter. The precise definition employed herein is as provided in en.wikipedia.org/wiki/Cram%C3%A9r%E2%80%93Rao_bound, which is incorporated herein by reference.

A "localized" light distribution, as the term is used herein, shall refer to a light distribution with energies concentrated on a small domain. A light distribution will be localized if the energies, outside a radius of 3.5*the half Rayleigh criteria are substantially zero.

This invention description assumes that the optical system described is close to being "photon noise limited," as described in en.wikipedia.org/wiki/Shot_noise, or is close to being photon noise limited, i.e. the Gaussian noise component is smaller than half the photon (or shot) noise. The optimal case is indeed a "photon noise limited" optical system as described and a "Gaussian noise limited" or "detector noise limited" system will collect only part of the advantages of this invention, but is still in the scope of this invention.

"Full width at half maximum" (FWHM) is an expression of the extent of a function given by the difference between the two extreme values of the independent variable at which the dependent variable is equal to half of its maximum value, from Wikipedia, en.wikipedia.org/wiki/Full_width_at_half_maximum.

The "dimensionality" is defined as any one of the three physical or spatial properties of length, area and volume. In geometry, a point is said to have zero dimension; a figure having only length, such as a line, has one dimension; a plane or surface, two dimensions; and a figure having volume, three dimensions.

The dimensionality of a geometrical feature shall refer to the dimensionality, of a corresponding idealized feature in the limit in which the extent of the geometrical feature (such as the 'diameter' of a point object, or the 'width' of a line or the 'thickness' of a coating) is much smaller than the extent in any other dimension which tends to be zero.

A "locus", as the term is used herein, shall denote a set of points (commonly, a point, a line, a line segment, a curve or a surface), whose location satisfies, or is determined by, one or more specified conditions.

A "geometric parameter" shall refer to any measurable quantity characterizing an extent within a physical space. Thus, for example, a distance (defined in three-dimensional Euclidean space or along a surface) is an example of a geometrical parameter. An area defined on a surface is another example of a geometrical parameter.

A "geometrical feature" is a physical object characterized or modeled geometrically as a locus, quantified by one or more geometrical parameters; for example, the thickness of a line, describes a locus, the line, which is a locus, or the position and thickness of a line segment, which is also a locus. The "embedding space" represents the parametric space spanned by the geometrical parameters.

A "point", is a geometrical feature in two or three dimensions with zero dimensionality and zero size. It is an overstated simplification, erasing much information on real objects, but simplifying tremendously the assumptions. We refer to an object with small but not negligible sizes, compared to the System ruler, in all the three dimensions as "point-object". The terms small or negligible has to be appreciated compared with the system ruler, which, for optical systems is the limit of diffraction. A point object is determined by its position and its size, which can be isotropic, or not, in two- or three-dimensions. Most biological objects are, in system rulers of diffraction limited or super-resolved optical systems point-objects, and the a priori dismissal of the information carried by the point-object is a tremendous loss. The differentiation between points and point-objects is of major importance in this invention.

A "line" (and similarly other terms that refer to shapes that are one-dimensional in theory . . . ) shall refer to a geometrical feature (i.e., to a physical object, having a length, width and thickness), where the length is at least 10 times either the width or the thickness. A "line object" is defined following the same concepts as of a point-object.

An "intrinsic geometric parameter," as the term is used herein and in any appended claims, shall refer to a parameter characterizing a property of a surface (in n-dimensional space) that is independent of the isometric embedding of the surface in Euclidean space. Thus, for example, the width of a "line" though a given point is an intrinsic parameter of the line, independently of any direction of the line in space Referring to a geometrical element in an abstract space, a set of parameters shall be referred to as "adequate" if and only if the representation of the geometrical element described by the set of parameters faithfully represent the geometry class and parameters of the object in the limit of the measurement uncertainty.

"Singular Optics", which includes "optical vortices" as its simplest example is today an emerging domain of optics, with theoretical as well as practical applications. Detailed description may be found in Nye, et al., *Dislocations in wave trains. Proceedings of the Royal Society of London A, vol.* 336, pp. 165-90 (1974), and in Soskin, et al., "*Singular optics,*" *Progr. in Optics*, vol. 42, pp. 219-76, both of which references are incorporated herein by reference.

"Inelastic optical interaction" refers to interactions between light and matter creating photons which differ in wavelength from the incoming beam. Inelastic optical interaction includes, but are not limited to fluorescence, multiphoton interactions and Raman scattering.

The "locus of a singular distribution" is the ensemble of Cartesian positions on which the intensity of the singular distribution is zero. The locus of a singular distribution defines a family of elementary shapes, which, with adequate parameters, "the nominal parameters" and positioned at the right position; "the nominal position" will not emit (or reflect or scatter) light. In this case we will coin the new concept and express that the "singular light distribution embeds the shape". For example, for the light distribution depicted as case 10 (or 01) in FIG. 2, the vortex, the locus is an infinitesimally small point and the only families of shapes which can be studied using a vortex are the point shape and the point-objects shape, which will also create no energy with a radius of value zero. For the distribution described as case 42 (or 24) in FIG. 2, named "vertical half-moons", the relevant families of shapes are more diverse, including lines and line-objects but also pluralities of the point shapes and of the point-objects. Additional cases will be developed in the following.

Conical refraction is an optical phenomenon predicted by Hamilton, "*Third supplement to an essay on the theory of systems of rays,*" *Trans. Royal Irish Acad.*, vol. 17, pp. 1-144 (1837), and experimentally confirmed two months later by Lloyd, Lloyd, H. (1831). "*On the Phenomena Presented by Light in Its Passage along the Axes of Biaxial Crystals,*" *Philos. Mag.*, vol. 1, pp. 112-20 (1831). Both of the foregoing references are incorporated herein by reference. Conical refraction describes the propagation of a light beam in the direction of the optical axis of a biaxial crystal. Hamilton predicted that the light emerges in the form of a hollow cone of rays.

A description, provided in Berry, "*Conical diffraction asymptotics: fine structure of Poggendorff rings and axial spike,*" *J. Opt. A: Pure and Applied Optics*, vol. 6, pp. 289-300 (2004), which is incorporated herein by reference. A prior art system based on conical diffraction for super resolution microscopy is described in Sirat 2016.

U.S. Pat. No. 8,514,685 (Sirat '685) described specific properties of conical diffraction in thin crystals and demonstrated the use of conical diffraction to shape optical beams. A thin biaxial crystal transforms the Point Spread Function (PSF) of a regular incident beam into an extensive family of light distributions, the choice of the distribution being controlled by the input and output polarizations. Practically, beam shaping is achieved by enclosing the biaxial crystal between controllable polarizers; this simple optical set-up, similar to a polarimeter, has the ability to switch from one pattern to another pattern with a different topology in microseconds—or even faster. In addition, these patterns are perfectly co-localized, as they are produced by the same primary optical beam.

The CODIM beam shaper may be used as an add-on to a scanning module and the distributions are scanned on the sample, yielding several micro-images for each scan point. A CODIM system is available from BioAxial SAS of Paris, France.

The CODIM beam shaper generates compact, localized light distributions using the conical diffraction principle. Each microimage contains a large amount of high frequencies, close to Abbe's limit (up to a factor close to 3 compared to an Airy pattern 101, as depicted in FIG. 1. These light distributions, projected onto a region of the sample referred to as a "scene," are analyzed using algorithms well known to persons of ordinary skill in the art. For exemplary algorithms suited for deriving super-resolved imagery from microimages, the reader is referred to Published Application WO 2016/092161 (published in English as US 2017/0336326, hereinafter "the Sirat '161 application), which is incorporated herein by reference. This allows reconstruction of a super-resolved image, for general objects, with an improvement of resolution up to a factor of 2. Additionally, these algorithms, leveraging positivity constraint and sparsity, allow for the resolution to be improved even further, for adequate samples.

Ultimately, the conjunction of much lower distribution peak power, use of a high quantum yield camera and a longer camera exposure time drastically reduce the peak power—and the energy—of light sent to the sample. Such is the reason for this method's very low photobleaching and phototoxicity. This also avoids fluorophore saturation issues, making the method linear and quantitative.

In the present Description, the term "energy law" is defined as follows: Assuming that an object has been modeled as a mathematical abstraction, the geometrical shape, the "energy law" is the parametric relation between the energy, as a function of the shape parameters and the position. It creates a relationship quantifying the energy dependence of the parametric space. The energy law may include the energy distribution, emitted by a luminous object with a shape identical to the geometric shape.

In the present Description, it is assumed that the optical singular distributions can be controlled, in such a way to switch from one type of distribution to another, from a predetermined family of distributions, and to modify the parameters of the optical singular distributions using external means, as described in Sirat '185. Other solutions exist, not requiring the optical singular distributions to be controlled, and are part of this invention, but they will be much more cumbersome.

Imaging performed using methods in accordance with the present invention may be referred to as "compound imaging," and may also be referred to as coded imaging, as defined in Wikipedia, en.wikipedia.org/wiki/Coded_aperture, or as "indirect imaging," in reference to imaging processes in which the elemental data from the scene is not an image, or a map, in the sense of Sirat '185 patent, describing the object. In a compound imaging process, the data measured by the physical instrument, referred to as the "intermediate result," (the term used in the Sirat '161 application), or elemental (or underlying) data, as used synonymously in the present Description, contains information from which a reconstructed image, can be created through a reconstruction process. We will identify in this invention a compound imaging process as an imaging process in which it is not possible to assume an intensity, or a number of photons, measured at a specific time and position to a specific pixel of an image or to a specific attribute of an element in a map. In simplified words, a compound imaging system the intensity or number of photons does not have a direct translation to pixel data but contains information relevant to several of them.

In the domain of superresolution microscopy, CODIM imaging is an example of a compound imaging process as well as Structured Illumination Microscopy (SIM), or localization microscopy techniques such as PALM/STORM, referenced in Sirat '185 patent.

The "measurement procedure", will consist of a set of "elementary singular measurements", each elementary singular measurement consisting of the projection of a predetermined singular light distribution, with given parameters, positioned such that the locus of the singular distribution is embedding the geometrical shape at the nominal parameters, and of a "light measurement" quantifying the light incoming from the object, its intensity and optionally its spatial distribution, as recorded on a light detector, either pixelated or not. In some cases, "elementary regular measurements" consisting of the projection of a predetermined regular light distribution, may also be used, to complete the information gathering.

The "inputs" of a measurement refer to the position of the optical singular distribution, its type and parameters. The "outputs" are the light intensity, and/or the light distribution, recorded in the measurement. We assume that the reader is a man skilled in the art and is familiar with "Control theory". Control theory is an interdisciplinary branch of engineering and computational mathematics that deals with the behavior of dynamical systems with inputs, and how their behavior is modified by feedback (from Wikipedia).

The "control means" will refer to a set of control hardware, able to modify the inputs and a "control algorithm", able to foresee next steps of input values required to quantify directly or by successive approximations the "energy law" in a way adequate for retrieving the parameters with precision. The "inverse energy law" is a recipe, optimal or not, able to retrieve the parameters of the shape, from a set of measurements of a single singular distribution or of a set of singular distributions. It is embedded in the control algorithm. It will be chosen to optimize the functional parameters of the system, either the number of steps required, the overall energy—or power—impinging on the biological object, the speed of measurement, any combination of the above or any other functional parameters of the system.

In the context of singular distributions, a "value close to zero" shall refer to energy used to qualitatively describe intensity projected or energy emitted which are reasonably smaller than the maximum intensity available on the projected light or of the energy emitted if the maximum of the projected light is impinging on this point. A quantitative value for a close to zero intensity or energy is a factor of six between the intensity projected and the maximum intensity of the distribution or between the energy emitted and the energy emitted if illuminated at maximum intensity. It is worth mentioning, that assuming Poisson noise, energy close to zero will have a noise value markedly smaller, close to two and half times less, then at maximum energy. Similarly, a parameter value of geometrical shape "close to zero" will have a value smaller than the full range of the parameter divided by 2.5.

In accordance with embodiments of the present invention, an observed object may be modeled either as a specific shape, known or hypothesized beforehand, or either as a shape in a list of potential shapes. The geometrical shape may be described in terms of:

a. a spatial position, the "position" of the shape, referring to the position of an origin point determined in the shape, in most cases, the center of gravity of the light distribution.

b. a set of "structural parameters" describing the "shape parameters", for example, for an isotropic circle its radius (FIG. 2C), for an object represented by an ellipse (FIG. 2D), the ellipse semi-axes axes and angle.

The term "machine learning," as used herein, refers to a field of computer science that uses statistical techniques to give computer systems the ability to "learn" (e.g., progressively improve performance on a specific task) with data, without being explicitly programmed to do so.

The term "representation learning" and "deep learning" are used in accordance with LeCun 2015, as laid out above. LeCun 2015 clearly draws the borders between "representation learning" and "deep learning" on one hand and standard "machine learning", on the other.

The terms "representation learning" and "deep learning" are used interchangeably herein because all embodiments of the present invention apply to both. Parts of the invention may be applied also to machine learning.

In the Metrology Case (as defined above), data are acquired at nominal positions of the objects identified. A "nominal position," as it refers to an object, shall mean a position assumed from previous knowledge or from a hypothesis to be the position of the object.

It is assumed, for purposes of the present description, that a separate mechanism had been used to gather the nominal position of the object. Within the scope of the present invention, this mechanism may use any localization technique, as for example the measure of the centroid of the light distribution created by the object in another imaging modality or directly on a camera.

RATIONALE OF THE INVENTION

The present invention introduces new methods for the measurement of parameters of biological, life science or physical objects modeled as geometrical shapes. In accordance with the methods described herein in detail, systems are created to directly access parameter values of elementary geometrical shapes; the method and systems take advantage of the properties of singular light distributions, and are limited neither by diffraction, as is imaging, or photon flux, as is parameter assessment using an imaging paradigm and image processing tools.

Novel measurement methods described herein are correlated with physical insight, first described here, to our knowledge, in the form of a specific restriction of the direct application of Abbe's resolution limit to measurement.

Indeed, going back to Abbe's resolution law as described by Schermelleh 2010 or by Horstmeyer, et al., "*Standardizing the resolution claims for coherent microscopy.*" *Nature Photonics* 10, pp. 68-71 (2016), incorporated herein by reference, all "bandwidth extrapolation" techniques, reconstructing information above the Abbe's limit relies on prior knowledge, assumptions or even guesses, which in some case may be wrong. We describe here, the only case to our knowledge, of measurement—without prior knowledge, assumption or guesses—above the Abbe's resolution law, which is the case . . . of a black (null) image.

Due to the positivity constraint, a null image contains no signal and so no spatial frequencies below and above the Abbe's limit and all the frequency contents are fully known . . . to be zero; a null image allows quantifying high frequency contents, to zero, above the Abbe's limit, from a diffraction limited optical measurement.

This is antagonistic to the naïve view of Abbe's law, which is understood as if that no information can be retrieved by an optical process above the Abbe's limit. The case described in this invention, even if it is very peculiar, allows gathering information above the limit, theoretically up to infinity, and so, is diffraction unlimited.

This condition is specific to optics, and similar unipolar signals, and is due to the positivity constraint, which is an additional physical constraint on the solution, independent of the diffraction limit. These concepts will not apply swiftly to electrical signals, or similar bipolar signals. The positivity constraint is known, somehow, to allow additional information, but its contribution to the extension of the information is, in most practical cases, marginal and not well characterized or quantified. In this invention, the influence of positivity constraint is clear and determinant, allowing accurate quantification of the spatial frequencies below and above the Abbe's limit.

Several formulations of the Abbe's resolution law coexist. A preferred phrasing of Abbe's resolution law is that of Schermelleh 2010: "No periodic object detail smaller than this shortest wavelength can possibly be transferred to the image". (Schermelleh 2010, at p. 166) The results of the present invention constitute a corollary of Abbe's resolution law, and not an exception.

However, the results of the present invention are indeed an exception and a rebuttal of some widespread formulations of Abbe's resolution law in the scientific literature, less carefully phrased, "no frequency component can be measured above the Abbe's resolution limit".

In most cases, the null image contains no information and this singular point or exception is useless and trivial and this discussion in these cases may seem pointless and empty. However, the recorded image of an isolated point, with given size, illuminated by an optical vortex positioned at the nominal position, will be identically zero, only if the size is zero. In this specific case, the full nulling of the image and of all its frequency components is a powerful measure, from which it is possible to retrieve not only the position but also the size, as will be explained later, of a point-like object.

This invention additionally introduces a new method, which can be applied to any compound imaging system and is exemplifies in more details in the case of CODIM imaging. It consists of applying a direct bridge, in most cases a specific neural network directly on the elemental data. In previous paragraph we described how to apply a natural pathway (or bridge) between elemental data in a compound imaging process to direct Metrology methods. In this paragraph, we describe how to apply natural pathway (or bridge) between elemental data in a compound imaging process, or to deep learning, by applying a deep learning layer, supervised or unsupervised, directly to the elemental data, without any image reconstruction algorithm. Additionally, this layer will be able to collect data from measurements from several times (consecutive in most cases). The results of this layer, either the metrology or object layers, will be the direct input to further processing, bypassing the image or map steps, which may still be used for visualization, qualification and monitoring.

Both processes, direct metrology methods and deep learning can also be compounded to create even stronger and more powerful acquisition tools.

The methods described in accordance with the present invention differ from all prior art methods which have ever been described or suggested, at least in that all prior art methods treat image gathering as a mandatory step.

The Sirat '185 patent nowhere suggested employing a deep learning or neural network layer, using detected light as direct input of the neural network layer, able to classify the scene, as a plurality of shapes, static or dynamic, the shapes being part of a family of elementary shapes predetermined or acquired by learning. In accordance with the present invention, a deep learning layer for structuring directly the raw data information as elementary objects, with metrological characteristics and attributes, these elementary objects being the adequate substrate of further generalizations. This approach, consistent with the viewpoint of deep learning, is developed in this invention.

It is to be noted that the Sirat '185 patent relies on the physical reality, and to define the measured map as the descriptors of the fluorophores, this new positioning is coherent with the biological reality, defining biological entities, as in our example, the Influenza A virus, as the structuring concept.

Additionally, the method can be extended to dynamic characteristics, retrieved either as time-dependent data, or preferably as higher-level dynamic parameters. In short, getting back to our example, the intermediate layer may be able to determine the presence of a point-object of 110 nm, moving along a path at fixed velocity, without morphological changes; and we will assume, in the next layer, the object classification layer, that it is the Influenza A virus.

An additional merit of the proposed architecture is to avoid reconstruction artifacts by bypassing the reconstruction step. Even the best reconstruction algorithm may be prone to artifacts and the possible presence of artifacts is one of the barriers to adoption of super resolution techniques by biologists. To make things even worst, many artifacts can be mistakenly considered as small points or objects, and classification and quantification algorithms can be spoiled by these artifacts. Avoiding reconstruction and performing classification and quantification on the raw data totally remove this source of error.

Information above the diffraction limit exists in the metrology data, as described above, and can also be present in the imaging data. This priceless information is typically erased by reconstruction processes, unable to process this information separately from all other information and so forced to apply general procedures, optimized for averaged data, but not fitted to these specific cases.

Geometrical and Biological Information Through a Non-Imaging Process

The Sirat '185 patent failed to suggest how geometrical and biological information can be learned through a non-imaging process. In such a non-imaging process, the higher levels of information are gathered directly from the measured elemental data, using a general-purpose learning procedure, without the requirement to create (or reconstruct) an image, or in Sirat '185 patent terms, to quantify the map. Sirat '185 patent fails to understand that the non-imaging direct learning might be retrieve information with much higher precision, as explained below, high computational efficiency, and without loss of data. Furthermore, such a learning procedure may have the ability to use of data present in the absence of light, described below and referred to as the Abbe's law loophole.

GENERAL METHODS

In accordance with typical embodiments of the present invention, the following features are salient:

distribution of light, at nominal position; the wavelength of the projected light is chosen such that it is able to create an inelastic light interaction with the light-responsive material, the singular distribution being chosen such that it embeds the geometrical shape, and so, with nominal parameters, the energy measured from the light created by the inelastic interaction of the projected light and the light-responsive material will be zero.

an algorithm, "the inverse energy law," is applied to retrieve the parameters from the energy measurements.

Methods in accordance with the present invention may advantageously employ measurement hardware and a measurement procedure controlling, dynamically or not, the sequence of measurements in order to gather the set of measurements required to retrieve the parameters of the shape.

The light-responsive material may be exogenous, based, for example by binding fluorescent binding or endogenous, using, for example direct fluorescent properties of some protein, or using Raman scattering.

For heuristic convenience, we follow each general statement of the method, in high-level language above, by the illustration of an example; the example is the simultaneous measurement, for a point-like object, of its position and size; to make it more illustrative, the point-object is described in terms of an Influenza Type A virus, as explained in a previous paragraph.

Figure 2C:
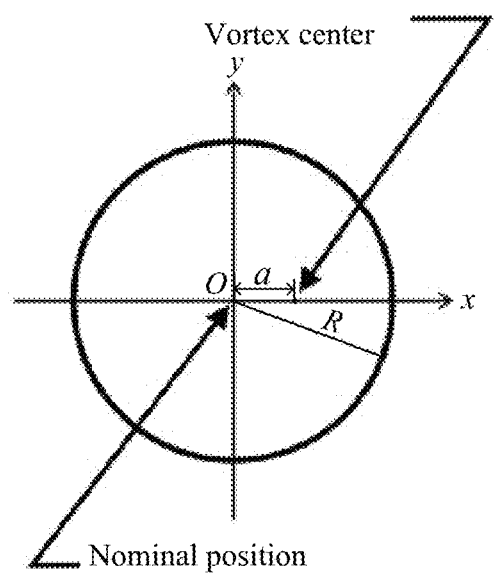

A general method may be illustrated using the simplest case of the virus, modeled as a two-dimensional uniform circle shown in FIG. 2C. The biological object is the virus; the measurement goal is, in this example, to quantify the diameter of the virus between 80 to 120 nm. The virus is assumed to be positioned on a two-dimensional surface.

The biological object is the virus modeled as a point-object, represented as in FIG. 2C, by its position and the radius R of the virus. The measurement consists of projecting a vortex of light, able to excite fluorescent molecules positioned on the virus, which embeds the point-object geometrical shape, at several positions $(x_i, y_i)$, using a measurement hardware consisting of a galvanometric two-dimensional optomechanical system able to scan the vortex on the biological sample, measuring the energy on a light detector, and converging to the position with minimal energy, using either an analytical or an iterative algorithm. In this case, the inverse energy law is very simple and the position is the position of the minimum and the energy, at minimum, is quadratically dependent on the radius (equation 3).

In general, methods of measurement in accordance with the present invention allow retrieving zero- one- and two-dimensional loci, using one or more different singular distributions and retrieve simultaneously one or more simple parameters and more complex or compound parameters.

Measurement of the Size and Position of a Point-Object

A first embodiment of the method is presented for measuring shape parameters: measuring the position and the size of a point-object in two-dimensions. It is one of the most common cases in the measurement of biological objects. Furthermore, it can be extended, mutatis mutandis to the measurement of the position and thickness of a line, another widespread task in measurements of biological objects.

Assuming a luminous object of circular shape (shown in FIG. 2C), with radius R, positioned at the origin, with a uniform density of fluorophores, represented as $n_D$, and assuming that $N_E = n_D \pi R^2$, is the total number of emitting fluorophores, an optical system is provided, such as that described in detail in Sirat '185 patent, that is adapted to move the position of a vortex, given as (v, 0), with high accuracy, in the plane. In the polar coordinate notation "(m, n)" employed herein, m refers to a radius vector in a specified transverse plane with respect to the z-axis, while n refers to the angle between a predetermined axis (x in FIG. 2C) and the radius. Without loss of generality, due to the symmetry of the problem, we assume that the vortex is positioned on the x-axis, i.e. the angle is zero.

The intensity of the vortex as a function of position is quadratically dependent, through a coefficient is, on the distance between the vortex null and the position where the intensity is measured. More particularly, for v>R (where R is the radius of the luminous object), the energy law will be given by $$I_{vR} = I_v + I_R = \int_0^{2\pi} \int_0^R i_s n_D [(v - r\cos\vartheta)^2 + (r\sin\vartheta)^2] r\, dr\, d\vartheta \quad \text{Equation (1)}$$

$$I_v = \pi n_D i_s R^2 v^2 = N_E v^2, \quad \text{Equation (2)}$$

$$I_R = 2\pi n_D i_s \frac{R^2}{4} = \frac{1}{2} N_E R^2. \quad \text{Equation (3)}$$

The energy law is the sum of two independent components:
a. $I_v$, the position dependence, independent of the radius, which minimum is positioned at origin, as will have been the minimum of an infinitesimal point, with $N_E$ fluorophores positioned at the nominal position, and
b. $I_R$, the radius dependence, which is independent of the position.

At nominal position, at v=0, the energy is given by equation (3). The inverse energy law is quadratic with the energy. The same 5% characteristics obtained by an optimal imaging experiment, can be reach, for a shot noise limited system, with only 100 photons, due to the quadratic dependence of the energy as function of the radius.

Measurement of the Size, Position and Ellipticity of a Point-Object

In a second embodiment of the invention, shape parameters may be measured: the position, size and ellipticity of a point-object may be measured in two dimensions. It is a least common case in measurement of biological objects, possibly because it is not possible to perform using any existing paradigm.

Figure 2D:
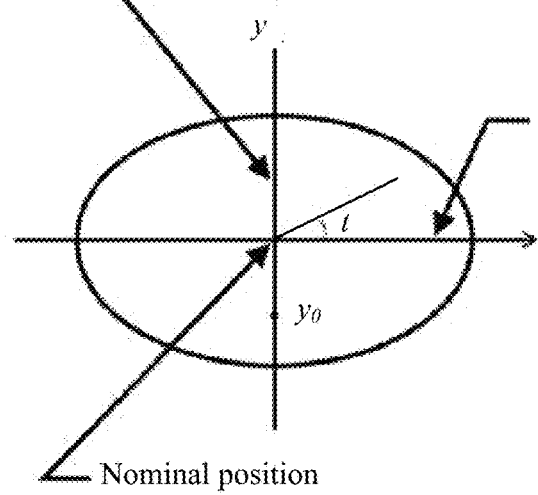
Figure 3:
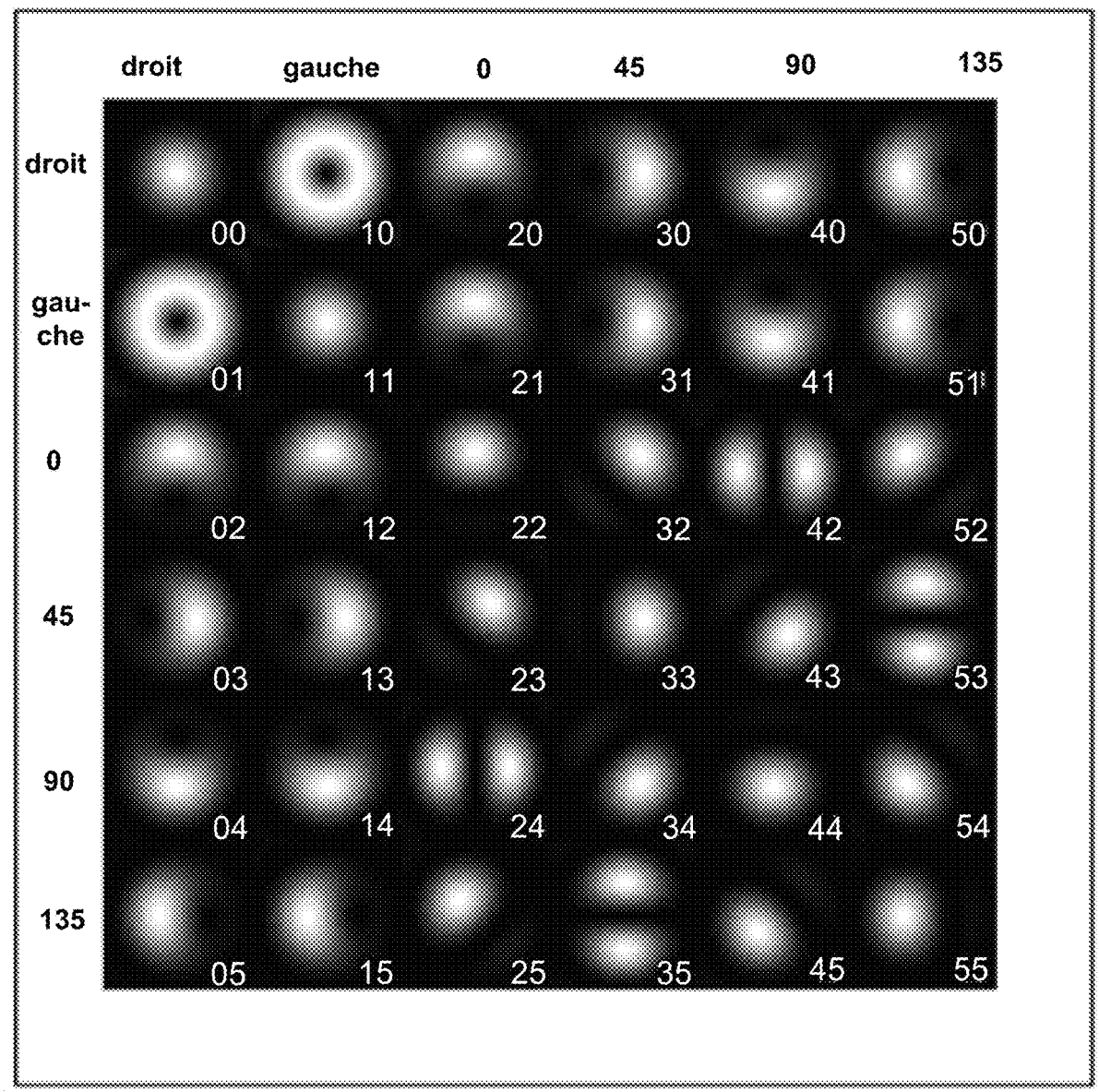
FIG. 3 is reproduced from U.S. Pat. No. 9,250,185 (hereinafter "Sirat '185") and presents some of the different singular distributions available using conical diffraction.

Assuming
a. a luminous object of elliptical shape, FIG. 2D, with minor- and major-semi axes a and b respectively,
b. the distribution position being given by (0, $y_0$) in cartesian coordinates, and not in polar coordinates as in the previous paragraph,
c. a uniform density of fluorophores represented as $n_D$,
d. projecting the half-moons distribution of FIG. 3,
e. that the half-moon" distributions, case 24 of FIG. 3, have been aligned with the direction of the major axis (x-axis in FIG. 2D);

in first approximation, a quadratic dependence of the intensity distribution in the direction y, perpendicular to the direction of the major axis, results. It can be shown that $N_E = n_D \pi a b$, is the total number of emitting fluorophores, where $\pi a b$ is the area of the ellipse.

An optical system is provided, such as that described in detail in Sirat '185 patent, that is adapted to move the position of a vortex, given as (v, 0), with high accuracy, in the plane. the polar coordinates notation, a refers to a radius vector in a specified transverse plane with respect to the z-axis, while b refers to the angle between a predetermined axis (x in FIG. 2C) and the radius. Without loss of generality, due to the symmetry of the problem, we assume that the vortex is positioned on the x-axis, i.e. the angle is zero.

Under the assumption that the distribution is angularly aligned with the major semi-axis b, the x-axis of FIG. 2D, and displaced by $y_0$, the intensity of the distribution as a function of position y is quadratically dependent, through a coefficient is, on the distance on axis y, and independent of x.

The equation of an ellipse is given by $$x = a\cos(t) \text{ and } y = b\sin(t) \quad \text{Equation (4)}$$

at a given (x, y) cartesian position, the intensity is $i_s (y-y_0)^2$, is being the quadratic parameter.

The integrated energy along the y axis, at a given x=A position is given by:

$$I(x) = i_s n_D \int_{-A}^{A} (y-y_0)^2 dy = i_s n_D (2Ay_0^2 + \tfrac{2}{3}A^3), \quad \text{Equation (5)}$$

where A is positioned on an ellipse, A=a sin(t), as stated above. Integration on x yields two terms, the first one, $I_{y0}$, depending quadratically on $y_0$:

$$I_{y0} = 2i_s n_D y_0^2 \int_0^\pi a\sin(t) dx = 2i_s n_D a b y_0^2 \int_0^\pi \sin^2 t\, dt,$$

using Equation (4) again, and its derivative dx=b sin(t) dt. The first term, $I_{y0}$, depends on $y_0$:

$$I_{y0} = 2\, i_s\, n_D\, ab\, y_0^2 \frac{\pi}{2} = N_E\, i_s\, y_0^2, \quad \text{Equation (6)}$$

which is the energy which will have been obtained for an infinitesimal point, with total number of emitting fluorophores, $N_E$, positioned at the origin. The second term, $I_a$, depends on the semi axis value through the equation:

$$I_a = 3i_s n_D \int_0^\pi (a\sin(t))^3 dx = 3i_s n_D a^3 b \int_0^\pi \sin^4 t\, dt;$$

again using equation (4), and its derivative dx=b sin(t) dt. The second term, $I_{y0}$, depends on the semi-axis a through:

$$I_a = 3\, i_s\, n_D a^3 b \frac{3\pi}{8} = \frac{9}{8} N_E\, i_s\, a^2 \quad \text{Equation (7)}$$

The foregoing is an energy depending on the semi-axis of the ellipse, a. A similar measure, using the half-moon"

distributions, case 24 of FIG. 3, aligned with the direction of the minor axis (y-axis in FIG. 2D), will yield a term depending on the major axis, and a comparison of these two terms will allows the measurement of ellipticity.

Assessment of the Position of Two Points Positioned at Two Different Planes

In accordance with further embodiments of the present invention, the relative position of two points in space may be measured using the techniques described herein, even when the two points are positioned at two different planes.

Figure 4:
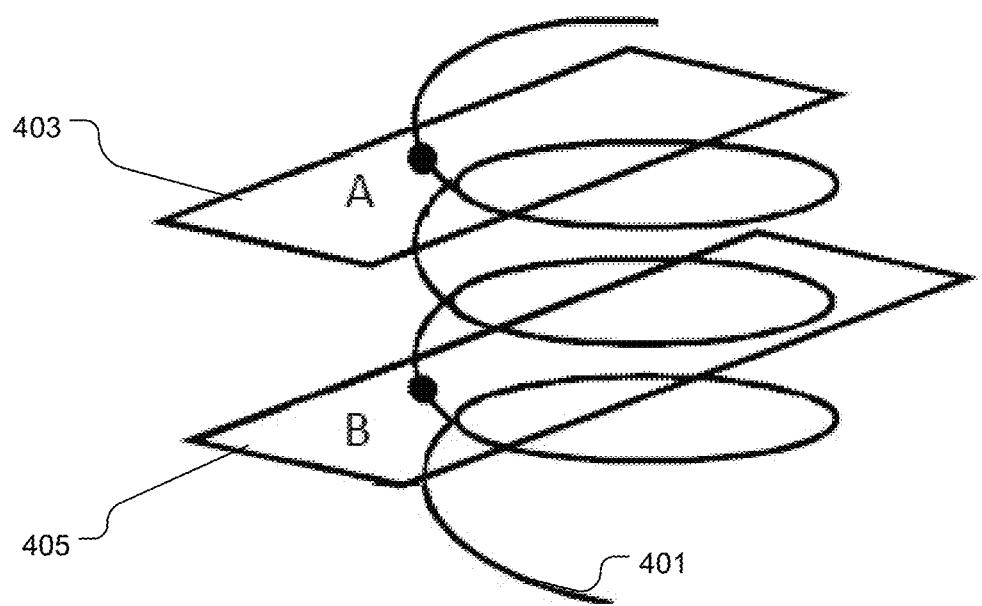
FIG. 4 represents a schematic of the locus of a crescent moon, known to be a spiral and plane A and B crossing the spiral at two points with different lateral positions, in accordance with an embodiment of the present invention.

Referring now to FIG. 4, the relative position of two points, positioned at two different planes, is a difficult problem, from a practical point of view, and is the heart of one of the most important metrology steps in the processing of semiconductors: overlay metrology. Assuming a crescent moon, as in case 02 of FIG. 3, the locus of this singular distribution is a spiral 401. The geometric shapes embedded in this distribution includes spiral shapes but also plurality of points positioned along the spiral. If two points are in two different planes 403 and 405, but are on the same spiral, the relative position of one point relative to the other may be monitored along the spiral and, the position of two-points at two different planes may be assessed with theoretically infinite resolution.

Implementation of Methods Using Conical Diffraction

Methods in accordance with embodiments of the present invention may also advantageously be implemented using conical diffraction, employing the teachings of Caron, J., et al, "*Conical diffraction illumination opens the way for low phototoxicity super-resolution imaging,*" Cell Adhesion & Migration 8(5): 430-439 (2014), which is incorporated herein by reference.

Figure 5:
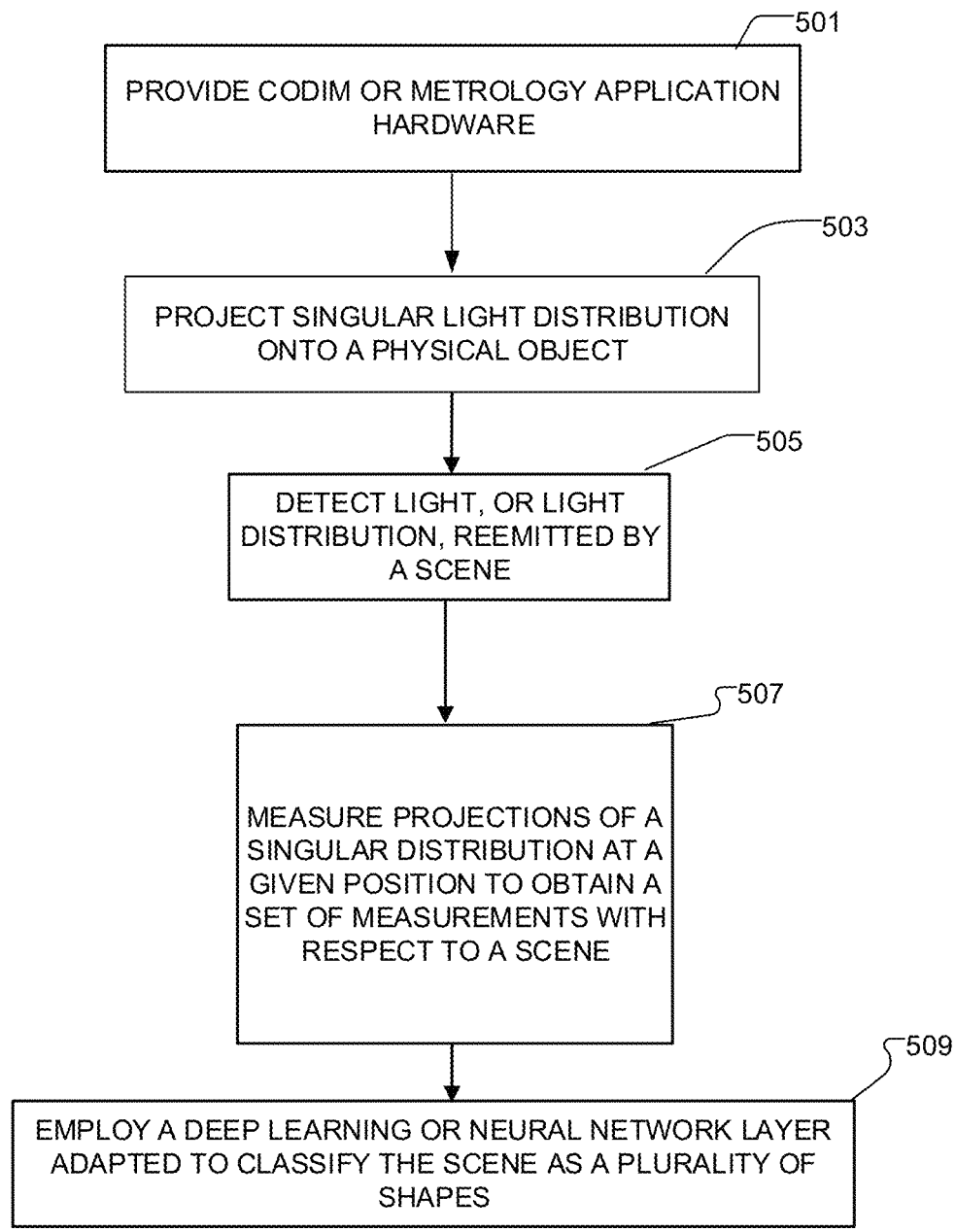
FIG. 5 is a flowchart showing steps of a method of representation learning in accordance with an embodiment of the present invention.

One embodiment of the invention is now described with reference to FIG. 5. A method, designated generally by numeral 500, is provided for determining a value of an intrinsic geometrical parameter of a geometrical feature of a specified dimensionality characterizing a physical object. To perform the claimed method, CODIM or Metrology Application hardware, as described in detail above, is provided (step 501) and a singular light distribution is projected (503) onto a physical object. Light excited by the singular light distribution that has interacted with the geometrical feature is detected (505) as it impinges upon a detector. A return energy distribution is identified and quantified (507) at one or more positions of the singular light distribution as a quantification of the intrinsic geometrical parameter. Finally, the value of the intrinsic geometrical parameter is determined (509) based on the value of the intrinsic geometrical parameter.

Figure 6:
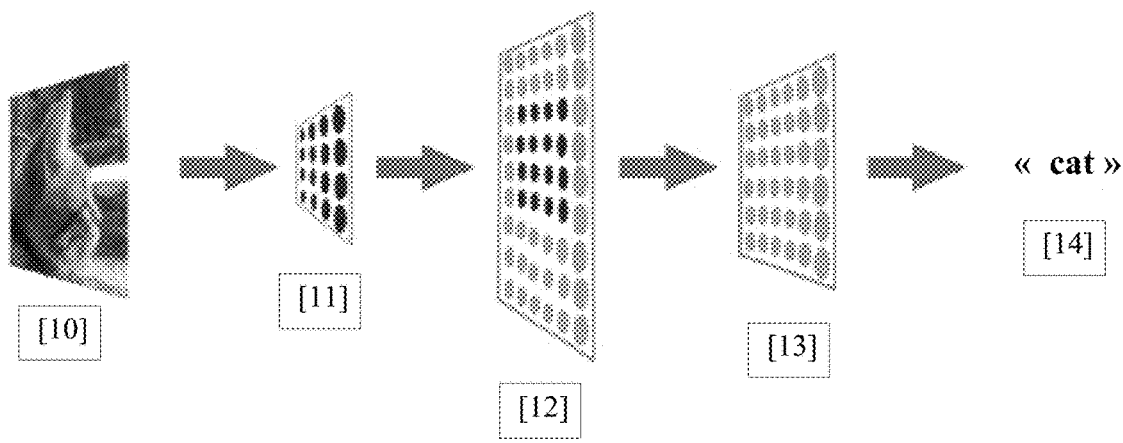
FIG. 6 schematically depicts the implementation of a deep learning system according to prior art.
Figure 7:
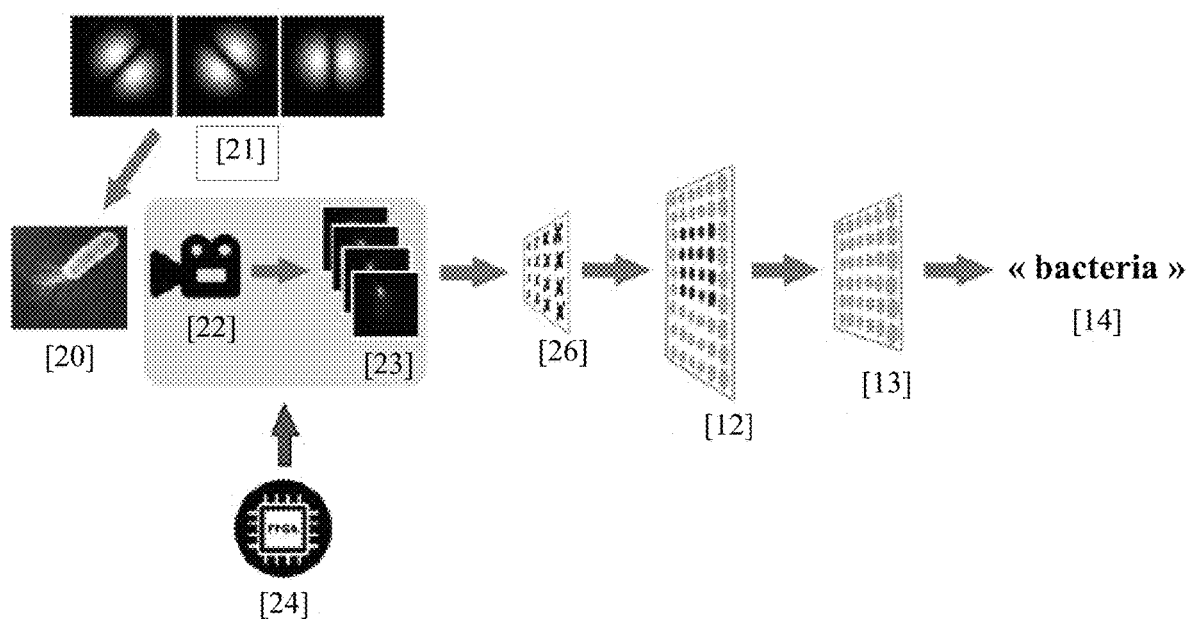
FIG. 7 schematically depicts the implementation of a deep learning system on a CODIM imaging system.

The use of standard deep learning concept on CODIM imaging is now described with reference to FIG. 7. A biological object, 20, represented graphically as a bacterium, is illuminated by a series of localized singular distributions, 21, detected by a suitable, low noise, imaging detector, 22. A series of microimages 23 (also referred to herein as "μimages," are recorded and processed by a suitable algorithm, 25, to yield a reconstructed, super-resolved image, 10. A deep learning network, including several layers, 11, 12 and 13, is applied on the reconstructed image in a process similar to the one described in FIG. 6. A control system, 24, is used to control and synchronize the acquisition and processing.

Figure 8:
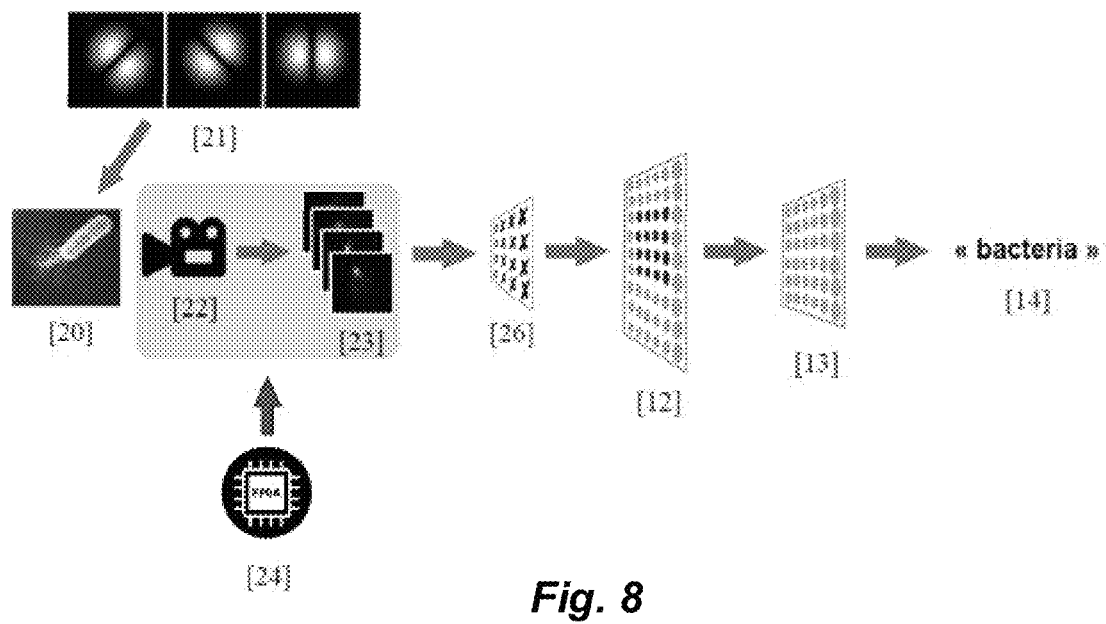
FIG. 8 schematically depicts the implementation of a direct deep learning network on a CODIM imaging system according to the present invention.

The use of a direct deep learning in CODIM imaging is now described with reference to FIG. 8. The biological object, 20, represented graphically as a bacterium, is illuminated by a series of localized singular distributions, 21, detected by a suitable, low noise, imaging detector, 22 also referred to herein as a "detector." The series of μimages 23 is applied directly, without reconstruction, to a deep learning layer, 26, which may differ from the layer used in the standard process. Additional layers, 12 and 13, which may differ from the layer used in the standard process are applied on the result of the first layer. A control system, 24, is used to control and synchronize the acquisition and processing.

Figure 9:
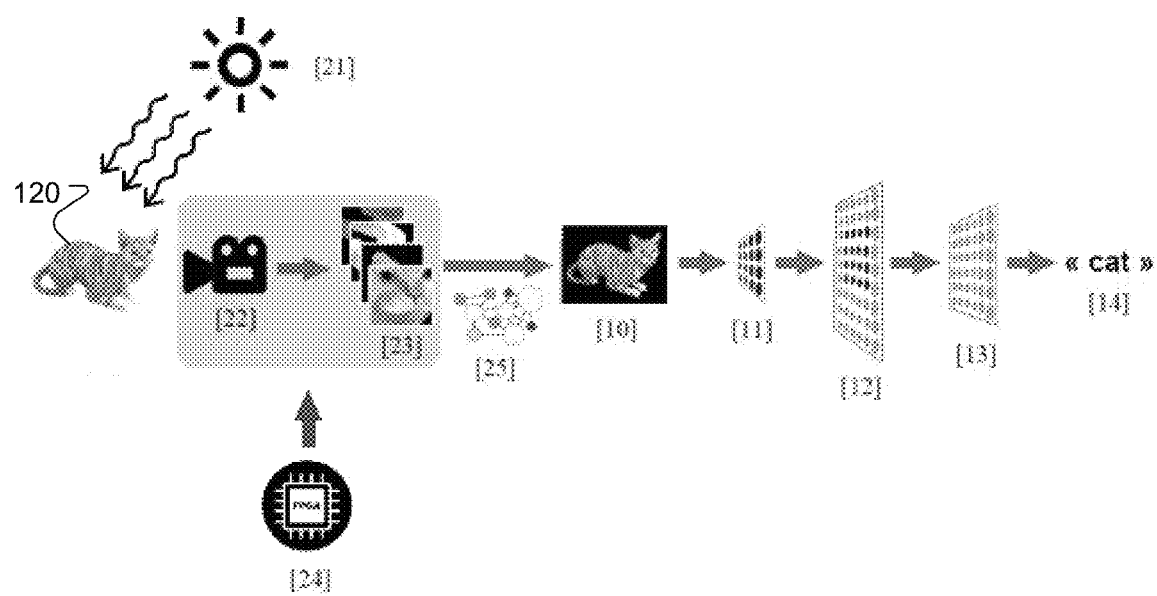
FIG. 9 schematically depicts the implementation of a direct deep learning network on a compound imaging system according to the present invention.

The use of standard deep learning concept on a compound imaging system is now described with reference to FIG. 9. A general object 120, represented graphically for a heuristic convenience as a cat, is illuminated by a series of localized singular or regular distributions 21, detected by detector, 22. The series of microimages 23, also referred to herein as "intermediate images," are represented as sub-images of a part of the cat picture, but it is only a graphical artifice. The series of μimages, 23, are recorded and processed by a suitable algorithm 25 to yield a reconstructed, super-resolved image 10. A deep learning network, including several layers, 11, 12 and 13, is applied on the reconstructed image in a process similar to the one described in FIG. 6. A control system 24, is used to control and synchronize the acquisition and processing.

The use of a direct deep learning in a general compound imaging case is now described with reference to FIG. 10. The general object 120, represented as a cat, is illuminated by the series of localized singular or regular distributions 21, detected by detector 22. The series of μimages, 23, or intermediate images, are represented as sub-images of a part of the cat picture, but it is only a graphical artifice. The series of μimages is applied directly, without reconstruction, to a deep learning layer 26, which may differ from the layer used in the standard process. Additional layers, 12 and 13, which may differ from the layer used in the standard process, are applied on the result of the first layer. Control system, 24 is used to control and synchronize the acquisition and processing.

The use of a controlled direct deep learning in CODIM imaging is now described with reference to FIG. 11. The biological object 20, represented graphically as a bacterium, is illuminated by series of localized singular distributions 21; the sequence of distributions, including their position, intensity, type, duration and timing is determined by the control system, based on external information 30 of any type, and/or partial or final information from the processing. The light distributions, emitted by the object illuminated by the different light distributions are detected by a suitable, low noise, imaging detector, 22. The series of μimages, 23, is applied directly, without reconstruction, to a deep learning layer, 26, which may differ from the layer used in the standard process. Additional layers, 12 and 13, which may differ from the layer used in the standard process are applied on the result of the first layer. The control system, 24, is used to control and synchronize the acquisition and processing and determine the sequence of distributions.

Figure 12:
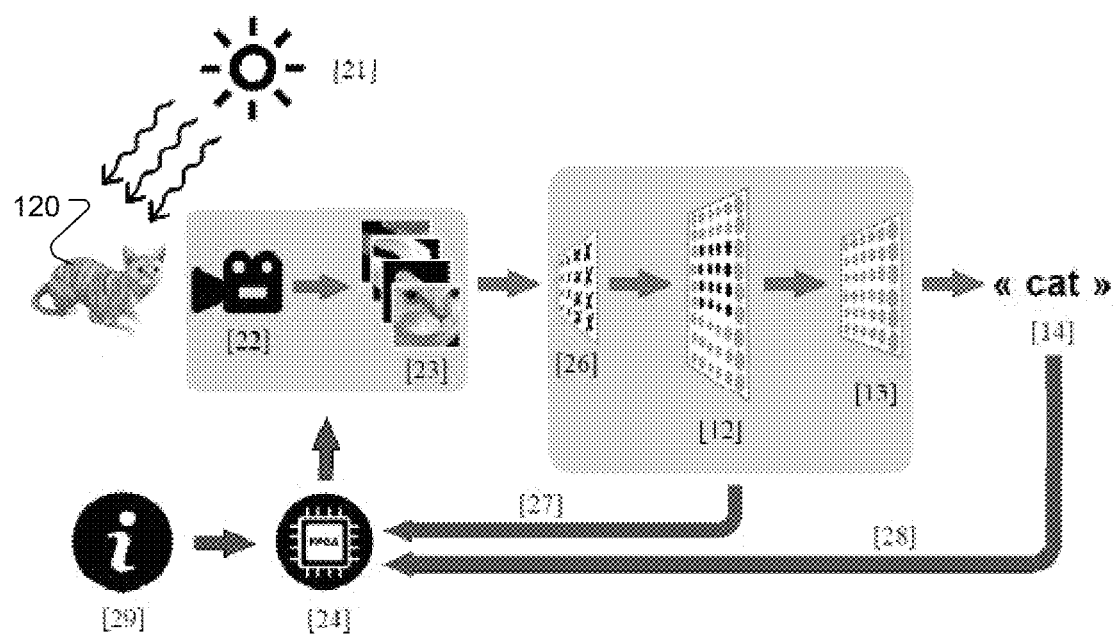
FIG. 12 depicts the implementation of a controlled direct deep learning network on a general object, represented for a heuristic reason as a cat. The fact that the intermediate images are represented as sub-images of a part of the cat picture is only a graphical artifice. The information will be unstructured information and not a partial view of the image.

The use of a controlled direct deep learning in a general compound imaging case is now described with reference to FIG. 12. A general object 120, represented graphically as a cat, is illuminated by series of localized singular or regular distributions, 21. The series of μimages 23, or intermediate images, are represented as sub-images of a part of the cat picture, but it is only a graphical artifice. The sequence of distributions, including their position, intensity, type, duration and timing, is determined by the control system, based on external information 30 of any type, and/or partial or final information from the processing. The light distributions emitted by the object illuminated by the different light distributions are detected by detector 22. The series of µimages is applied directly, without reconstruction, to a deep learning layer, 26, which may differ from the layer used in the standard process. Additional layers, 12 and 13, which may differ from the layer used in the standard process are applied on the result of the first layer. A control system, 24 is used to control and synchronize the acquisition and processing and determine the sequence of distributions.

Classifying a Scene Using Deep Learning

Features generally associated with methods in accordance with embodiments of the present invention include:

- a physical or biological scene, consisting of a plurality of luminous biological objects, each object being modeled as a luminous geometrical shape, the geometrical shape being quantified by an adequate set of parameters,
- a hardware set-up such as the Imaging Case described in Caron 2014 or the Metrology Case described above;
- a set of measurements, each measurement consisting of the projection of a singular distribution at nominal position, either on a regular or pseudo-regular grid, referred to as "the imaging case", or on a custom grid, referred to as "metrological case"; in the metrological case, the singular distributions are chosen such that they embed the geometrical shapes, and so, with nominal parameters, the energy measured will be zero.
- detecting light, from the singular light distribution that has interacted with the geometrical feature and that impinges upon a detector, pixelated or not, the light constituting detected light;
- A deep learning or neural network layer, using directly the detected light as direct input of the neural network layer, able to classify the scene, as a plurality of shapes, static or dynamic, the shapes being part of a family of elementary shapes predetermined or acquired by learning.

In accordance with other embodiments of the invention, direct and dynamic methods may also provide control hardware and a control procedure, controlling, dynamically or not, the sequence of measurements and detected light in order to gather an improved set of measurements required to retrieve the parameters of the shapes, by analysis of the elemental data by standard or deep learning procedures.

Details of Deep Learning Embodiments

In accordance with embodiments of the present invention, methods are provided that use the specificities and advantages of deep learning for analyzing imaging and metrology data acquired either by CODIM—Conical Diffraction Microscopy, as described in Caron 2014, or hardware implementing the Metrology Method, described above.

On basis of these methods, new systems for optical measurement of geometrical features are described herein, and, more particularly, for methods are described for measurement entailing resolutions greater than the diffraction limit imposed by the optics and minimal photon fluxes.

EXAMPLE

One embodiment of the present invention may be illustrated by the following example; this example is used just as an illustration and does not purport to represent a tested experimental case. The luminous object is assumed to be a biological object and this biological object, for illustration, to be the same Influenza Type A virus (IAV), represented schematically in FIG. 2A; this virus is known to have a typical size between 80 to 120 nm, and it is also known to be in most cases spherical, but it may also be in some case filamentous. Badham et al., "*Filamentous Influenza Viruses,*" *Current clinical microbiology reports*, vol. 3, pp. 155-61 (2016), incorporated herein by reference, state that "The biological significance of IAV morphology in human clinical infections is a subject of great interest." The IAV virus is assumed to be marked uniformly in all its volume with some adequate fluorescent proteins. Several models may be used to describe the virus; the virus is described as a point-object, modeled as an ellipse (FIG. 2D), with parameters being the half-minor axis, a, the half-major axis, b, and the angle of the major axis, θ, relative to a Cartesian referential.

In accordance with embodiments of the present invention, dynamic changes in the position and morphology of a virus are assessed, in order, potentially, to assess the virulence of the virus.

CODIM Embodiments

For imaging using deep learning, the CODIM system described in Caron 2014 may be applied, while, for metrology, the set-up described in the Metrology Application is preferred.

In accordance with embodiments of the present invention, methods are provided that use the specificities and advantages of deep learning for analyzing imaging and metrology data acquired either by CODIM—Conical Diffraction Microscopy, as described in Caron 2014.

Neural Network Embodiments

Spiliotis et al., "*Priming for destruction: septins at the crossroads of mitochondrial fission and bacterial autophagy,*" EMBO Reports, vol. 17, pp. 935-37 (2016) ("Spiliotis 2016"), incorporated herein by reference, taught:

Mitochondria are essential organelles for cell survival, programmed cell death, and autophagy. They undergo cycles of fission and fusion, which are subverted by infectious pathogens and altered in many human diseases.

Spiliotis 2016, at 935.

Pagliuso et al., "*A role for septin 2 in Drp1-mediated mitochondrial fission*", EMBO Reports, vol. 17, pp. 857-73 (2016) ("Pagliuso 2016"), incorporated herein by reference, showed that, among the multiple mechanisms that appear to regulate mitochondrial fission . . .

the Septin 2 has an important role by mediating mitochondrial constriction. Pagliuso 2016, Abstract, emphasis added.

This research used a BioAxial CODIM system to acquire images of the mitochondria, by acquiring the data and reconstruction the images.

Figure 10:
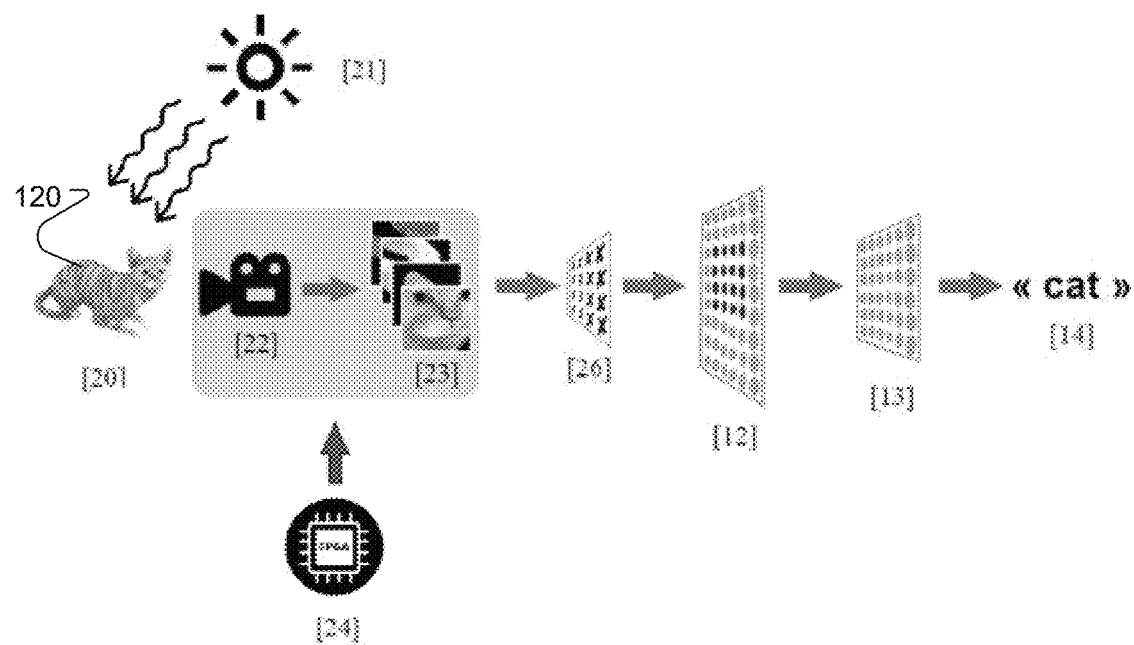
FIG. 10 schematically depicts the implementation of a direct deep learning network on a general object, represented for a heuristic reason as a cat. The fact that the intermediate images are represented as sub-images of a part of the cat picture is only a graphical artifice. The information will be unstructured information and not partial view of the image.
Figure 11:
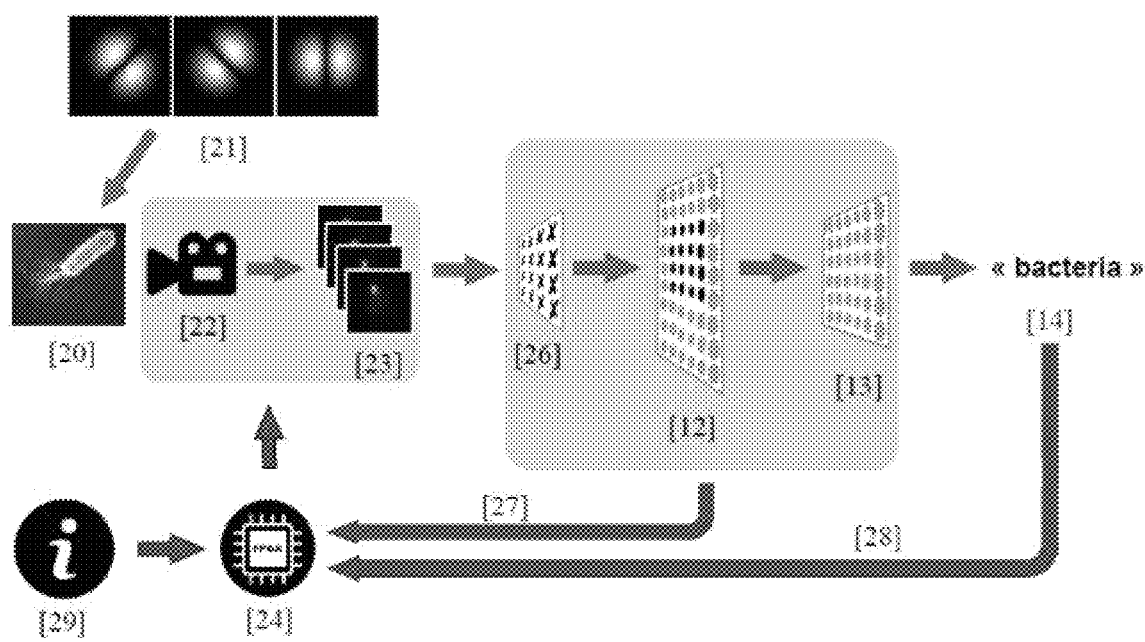
FIG. 11 depicts the implementation of a controlled direct deep learning network on a CODIM imaging system according to the present invention.

The reconstructed images of mitochondria can be used as the input of a deep learning network, to gather information on biological status, as shown in FIG. 10; alternatively, the gathered data can be fed directly to the deep learning network as shown in FIG. 11.

The embodiments of the invention described herein are intended to be merely exemplary; variations and modifications will be apparent to those skilled in the art. All such variations and modifications are intended to be within the scope of the present invention as defined in the appended claims.

I claim:

1. A method for representation learning for classifying a scene into at least one geometrical shape, static or dynamic, quantified by an adequate set of parameters, each geometrical shape modeling a luminous object, the method comprising:
   a. projecting a singular distribution of light onto a scene;
   b. detecting a light distribution, reemitted by the scene upon illumination by the singular light distribution that has interacted with each luminous object and that impinges upon a detector, the light detected constituting detected light;

c. measuring at least one projection of the singular distribution at a given position to obtain a set of coded image measurements with respect to a scene based on the detected light; and d. employing a neural network layer, using the coded image measurements based on the detected light as direct input of the neural network layer, adapted to classify the scene, as a plurality of shapes, static or dynamic, the shapes being part of a set of shapes predetermined or acquired by learning.

2. A method in accordance with claim 1, wherein the at least one geometrical shape is dynamic.

3. A method in accordance with claim 1, wherein the at least one geometrical shape is static.

4. A method in accordance with claim 1, wherein projecting the singular distribution of light comprises using conical diffraction microscopy (CODIM) hardware.

5. A method in accordance with claim 1, wherein detecting the light distribution reemitted by the scene comprises detecting reemitted light selected from the group consisting of fluorescence, optical transmission, optical reflection, Raman scattering, optical scattering, and multi-photon reemitted light.

6. A method in accordance with claim 4, further comprising:

optimizing the singular distribution of light as a function of classification information including the plurality of shapes; and repeating processes a, b, and c, including projecting the optimized singular distribution of light onto the scene.

7. A method in accordance with claim 1, further comprising performing the processes of projecting, detecting, and measuring therein in a plurality of instances, wherein employing the neural network layer, includes using the detected light from the plurality of instances to classify the scene as a plurality of shapes.

8. A method in accordance with claim 1, wherein the neural network layer forms part of a deep learning layer.

* * * * *